(12) United States Patent
Muanchart (10) Patent No.: US 11,540,452 B2
(45) Date of Patent: Jan. 3, 2023

(54) AIR MOVEMENT CONTROL AND AIR SOURCE DEVICE FOR CULTIVATION

(71) Applicant: Mankaew Muanchart, Muang Surin (TH)

(72) Inventor: Mankaew Muanchart, Muang Surin (TH)

(*) Notice: Subject to any disclaimer, the term of this patent is extended or adjusted under 35 U.S.C. 154(b) by 0 days.

(21) Appl. No.: 16/875,495

(22) Filed: May 15, 2020

(65) Prior Publication Data

US 2020/0275615 A1    Sep. 3, 2020

Related U.S. Application Data

(63) Continuation-in-part of application No. 16/470,123, filed as application No. PCT/TH2017/000082 on Nov. 17, 2017, now Pat. No. 10,667,472.

(30) Foreign Application Priority Data

Dec. 14, 2016    (TH) .................................. 1601007444

(51) Int. Cl.
   *A01G 9/24*    (2006.01)
   *A01G 9/18*    (2006.01)
   *A01G 7/02*    (2006.01)

(52) U.S. Cl.
   CPC .............. *A01G 9/246* (2013.01); *A01G 7/02* (2013.01); *A01G 9/18* (2013.01)

(58) Field of Classification Search
   CPC .......... A01G 9/025; A01G 9/246; A01G 9/24; A01G 7/02
   See application file for complete search history.

(56) References Cited

U.S. PATENT DOCUMENTS

| 1,675,200 | A | * | 6/1928 | Smith | ................ | F04D 29/708 |
| | | | | | | 210/416.1 |
| 3,949,522 | A | * | 4/1976 | Kehl | .................... | A01G 9/246 |
| | | | | | | 47/17 |
| 3,998,071 | A | * | 12/1976 | Barthel | ................ | F24F 5/0017 |
| | | | | | | 62/430 |

(Continued)

FOREIGN PATENT DOCUMENTS

| CN | 201479679 U | 5/2010 |
| CN | 201700204 U | 1/2011 |

(Continued)

OTHER PUBLICATIONS

International Search Report and Written Opinion for related International Application No. PCT/TH2017/000082, dated May 22, 2018; 9 pages.

*Primary Examiner* — Peter M Poon
*Assistant Examiner* — Morgan T Jordan
(74) *Attorney, Agent, or Firm* — Procopio, Cory, Hargreaves & Savitch LLP (57) ABSTRACT

An air movement system for plant cultivation. An air conditioner receives a gas mixture of air and carbon dioxide, regulates a temperature of the gas mixture, and outputs the gas mixture at the regulated temperature. A first bladeless fan receives the gas mixture output by the air conditioner and supplies the gas mixture as an air flow to a first crop area at a velocity towards an air intake. At least one second bladeless fan assists the air flow from the first crop area to a second crop area so as to maintain the velocity towards the air intake.

12 Claims, 9 Drawing Sheets

(56) References Cited

U.S. PATENT DOCUMENTS

| | | | |
|---|---|---|---|
| 4,196,544 A | 4/1980 | Davis et al. | |
| 4,218,847 A | 8/1980 | Leroux | |
| 4,219,008 A | 8/1980 | Schultz | |
| 4,332,105 A | 6/1982 | Nir | |
| 4,567,732 A * | 2/1986 | Landstrom | A01G 9/246 47/17 |
| 4,609,346 A | 9/1986 | Siccardi | |
| 4,737,103 A * | 4/1988 | Siccardi | A01G 9/246 432/51 |
| 4,742,475 A | 5/1988 | Kaiser et al. | |
| 5,101,593 A | 4/1992 | Bhatt | |
| 5,249,430 A | 10/1993 | Assaf et al. | |
| 5,279,609 A | 1/1994 | Meckler | |
| 5,315,834 A | 5/1994 | Garunts et al. | |
| 5,713,154 A | 2/1998 | Goldstein et al. | |
| 5,746,653 A | 5/1998 | Palmer et al. | |
| 5,813,168 A | 9/1998 | Clendening | |
| 6,230,437 B1 | 5/2001 | Wolverton et al. | |
| 6,446,385 B1 | 9/2002 | Crutcher | |
| 6,453,470 B1 | 9/2002 | Gazda et al. | |
| 6,727,091 B2 | 4/2004 | Darlington | |
| 6,910,419 B2 | 6/2005 | Oleson | |
| 6,923,617 B2 * | 8/2005 | Elexpuru | F04D 15/0016 415/127 |
| 7,243,460 B2 * | 7/2007 | Darlington | F24F 3/16 47/62 R |
| 7,565,768 B2 * | 7/2009 | Bula | A01G 9/16 47/89 |
| 7,832,144 B2 * | 11/2010 | Corradi | A01G 31/02 47/62 R |
| 7,972,111 B2 * | 7/2011 | Crawford | F04D 29/083 415/211.2 |
| 8,197,226 B2 * | 6/2012 | Fitton | F04D 25/08 417/198 |
| 8,516,743 B1 * | 8/2013 | Giacomantonio | A01G 9/025 47/62 A |
| 8,578,651 B1 * | 11/2013 | Giacomantonio | A01G 31/02 47/62 A |
| 8,734,094 B2 * | 5/2014 | Wallace | F04D 15/0218 415/175 |
| 8,770,946 B2 * | 7/2014 | Fitton | F04F 5/16 417/198 |
| 9,004,858 B2 * | 4/2015 | Nicolas | F04F 5/16 415/220 |
| 9,032,665 B2 | 5/2015 | Whitney | |
| 9,220,207 B2 | 12/2015 | Storey | |
| 9,445,557 B2 | 9/2016 | Darlington | |
| 9,462,755 B1 | 10/2016 | Coraggio et al. | |
| 10,390,496 B2 | 8/2019 | Carson | |
| 2003/0188477 A1 | 10/2003 | Pasternak et al. | |
| 2005/0005528 A1 * | 1/2005 | Brault | A01G 9/246 52/63 |
| 2008/0044892 A1 | 2/2008 | Wu | |
| 2008/0087165 A1 * | 4/2008 | Wright | B01D 53/04 95/51 |
| 2008/0274494 A1 * | 11/2008 | Kertz | C12M 23/50 435/29 |
| 2010/0257781 A1 * | 10/2010 | Batty | B01D 53/84 47/1.4 |
| 2010/0257878 A1 * | 10/2010 | Arbel | F24F 11/0001 62/93 |
| 2010/0275512 A1 * | 11/2010 | Nien | A01G 9/16 47/66.7 |
| 2011/0154985 A1 | 6/2011 | Mittelmark | |
| 2011/0192082 A1 * | 8/2011 | Uchiyama | A01G 31/06 47/66.6 |
| 2013/0042529 A1 * | 2/2013 | Roe | A01G 20/30 47/1.01 F |
| 2013/0055893 A1 * | 3/2013 | Lowe | A01G 31/02 95/92 |
| 2013/0118070 A1 * | 5/2013 | Marquez | A01G 9/025 47/66.6 |
| 2013/0160363 A1 * | 6/2013 | Whitney | A01G 9/022 47/59 S |
| 2014/0020292 A1 * | 1/2014 | McNamara | A01G 9/16 47/66.6 |
| 2014/0196880 A1 * | 7/2014 | Pinchuk | A01G 9/246 165/222 |
| 2014/0318011 A1 | 10/2014 | Jarvinen et al. | |
| 2015/0024674 A1 * | 1/2015 | McGregor | F04D 25/08 454/258 |
| 2015/0189840 A1 * | 7/2015 | Tanizawa | A01G 9/246 47/17 |
| 2015/0237811 A1 | 8/2015 | Marquez | |
| 2015/0264871 A1 | 9/2015 | Finnerty et al. | |
| 2015/0289452 A1 | 10/2015 | Axley et al. | |
| 2016/0007544 A1 * | 1/2016 | Takashima | A01G 7/02 47/1.01 R |
| 2016/0286737 A1 | 10/2016 | Kisting | |
| 2017/0273256 A1 | 9/2017 | Hutzel | |
| 2018/0054985 A1 | 3/2018 | Li | |
| 2018/0184602 A1 | 7/2018 | Ofir et al. | |
| 2018/0235155 A1 | 8/2018 | Funamori et al. | |
| 2018/0242539 A1 | 8/2018 | Bhattacharya et al. | |
| 2018/0263194 A1 | 9/2018 | Pilebro et al. | |
| 2019/0029189 A1 | 1/2019 | Maki | |
| 2019/0113219 A1 * | 4/2019 | Niemiec | A01M 1/08 |
| 2019/0261587 A1 | 8/2019 | Abe et al. | |
| 2019/0289803 A1 | 9/2019 | Gagne et al. | |
| 2019/0307078 A1 * | 10/2019 | Arbuthnot, III | B65D 88/74 |

FOREIGN PATENT DOCUMENTS

| | | | |
|---|---|---|---|
| CN | 202489019 U | 10/2012 | |
| CN | 102939871 A | 2/2013 | |
| CN | 203167709 U | 9/2013 | |
| CN | 203313826 U | 12/2013 | |
| CN | 204513637 U | 7/2015 | |
| DE | 3310382 C1 | 10/1984 | |
| EP | 0965264 A1 * | 12/1999 | |
| EP | 3039958 A | 7/2016 | |
| EP | 3155893 A4 * | 1/2018 | A01G 7/02 |
| FR | 2498050 A1 | 7/1982 | |
| FR | 2935596 A1 * | 3/2010 | A01G 9/025 |
| JP | 2007236235 A * | 9/2007 | A01G 7/02 |
| JP | 2011015655 A | 1/2011 | |
| JP | 2012000028 A | 1/2012 | |
| JP | 2014018196 A * | 2/2014 | |
| JP | 2016054713 A | 4/2016 | |
| KR | 200446513 Y1 * | 11/2009 | |
| KR | 20110004710 U * | 5/2011 | |
| KR | 20130044065 A * | 5/2013 | A01G 9/025 |
| WO | WO-2009128320 A1 * | 10/2009 | A01G 9/246 |
| WO | 2011/117437 A1 | 9/2011 | |
| ZA | 200803785 B | 4/2009 | |

* cited by examiner

AIR MOVEMENT CONTROL AND AIR SOURCE DEVICE FOR CULTIVATION

CROSS-REFERENCE TO RELATED APPLICATIONS

The present application is a continuation-in-part of U.S. patent application Ser. No. 16/470,123, filed Jun. 14, 2019, which is a national stage entry of International Patent App. No. PCT/TH2017/000082, filed Nov. 17, 2017, which claims priority to Thai Patent App. No. 1601007444, filed Dec. 14, 2016, which are all hereby incorporated herein by reference as if set forth in full.

BACKGROUND

Technical Field

The present disclosure relates generally to agriculture and engineering, and, particularly, air movement control and air velocity retention devices directed to plant cultivation.

Related Art

Air movement involves air moving from one place to another. There are two types of air movement:
1. Wind, referring to the movement of air in the horizontal direction. It causes the distribution of air to the locations of the earth.
2. Air current, referring to the movement of air in the perpendicular (vertical) direction. It is involved in the formation of clouds, rain, drought, etc.

Wind is an important factor for plant growth. In addition to helping to pollinate crops and distribute seeds, wind also plays an important role in the growth of plants, helping to carry carbon dioxide for photosynthesis. The movement of water vapor, the other gases and temperature affect the photosynthesis process, making the process occur faster. A plant growing in areas where the wind blows lightly may be compared to a plant-growing area of wind blows with speed of 1-5 mph. The rate of growth is better to plant in area with light wind, especially the growth of the stem and roots of plants. There are also disadvantages, such as when a strong wind causes the crop to blow down, loss of a crop, destruction of soil fertility, or is an obstacle a chemical spray.

The patent No. ZA 200803785 B describes methods and tools to control the air flow moving through a plant such as a tree, which can be applied to crops. Further, control the airflow through various parts of a plant is described.

The patent No. CN204513637 of Shanghai Yizhuo Energy Technology Co., Ltd. provides a synthetic weather system that includes air purifiers, fans, boxes, and a container-based acreage-controlled environment. A fan inflates airflow pressure into a container through a plant nutrient (e.g., culture medium), located at the roots of the plant. An aerator is used to solve the problem of pollution from a container-based crop acreage-controlled environment. This approach offers low power consumption and uses less space as well.

The patent No. JP2013111072 of Dyna Air KK describes the system and methods of air conditioning to controlled temperature of a plant's growth system and wind. By blowing air from the side of the plant to air through the top, air flows out in the perpendicular (e.g., vertical) direction to the imported air, to solve the problem of temperature control of the plant.

Patent No. JP201200028 of Shimizu Corp. (Shimizu Corp.) reveals that the presence of carbon dioxide in the air helps plant growth. The invention provides a fan in two key positions, one to assist in controlling the wind (the fan in the ventilation duct adjacent to the root of the plant), and another fan in a plant compartment for ventilating by blowing air back into an intake tube.

In searching the literature, we only find the winds control for plant growing system. There are no relevant inventions related to the use of air currents in the plant growing system.

Planting under conditions of a controlled wind is another factor that helps plants grow faster, but often presents problems in controlling the wind in a stable manner across an entire planting area. It is also difficult to stabilize the temperature distribution over an entire planting area. As a result, the quality of plants is not equal. The plants near the wind generator grow better than the plants that are farther away. Occasionally, plants in some areas are dwarfed or die. The planters solve the problem by planting the plant only in the area of stabilized wind. This limits the growing area to less than it should be and reduces its commercial output. Another problem is plants that grow vertically. In passive closed systems, plants on an upper-level plant shelf grow less than the plants on the lowest level even though they are provided the same nutrition and light because carbon dioxide, the key gas in photosynthesis, moves downward due to its density.

SUMMARY

According to an aspect of the present invention there is provided an air movement control and air source device.

The air movement control includes a fixed installation of an air velocity retention device (AVRD), or an air source device for cultivation, or both. A process of picking up carbon dioxide and products resulting from the photosynthesis process by the movement of air through an area that cropping at a steady speed provides constant temperature and high carbon dioxide concentration throughout the planted area. This provides a solution to the problem of vertical cropping, which have a distribution of carbon dioxide that is dense at the bottom of the vertically-oriented crop rail (931), causing crops at the top growing area to not be as good as the crops situated further vertically below.

BRIEF DESCRIPTION OF THE DRAWINGS

An embodiment, incorporating all aspect of the invention, will now be described by way of example only with reference to the accompanying drawing in which.

DETAILED DESCRIPTION

An "air velocity retention device" or "AVRD" refers to a device that reduces or increases the speed of air movement. It has the ability to control the direction of air movement by install fans with propellers or bladeless fan. For example, the speed at which device passes is equal to, or close to, the speed of movement of the air that the grower sets for each crop.

A "crop rail" refers to a support for small containers used for planting crops. The crop rail may be a long unitary structure, can separate into pieces, or can be separate and put them together.

A "plane" refers to an area that comprises a line with at least 2 points and can be drawn straight. If there is any object or material placed on the line passing through the plane, it can be dragged to any point along a line. In this case it will be said that such objects or materials are on the same plane.

The definition of "air movement" refers to the movement of air from one place to another place. In the present application, we describe two types of air movement: wind and air current. It is also noted that the movement of air can occur in an angle which not horizontal and not vertical (e.g., not perpendicular to horizontal).

Air current is typically the movement of otherwise dormant air by convection. It may be naturally caused by the temperature of a lower region being hotter than temperature of an upper region. The hot air rises, and the cold air moves to replace it. This causes the distribution and circulation of wind that can affect the growth of plants. Because plants use carbon dioxide to photosynthesize, winds blowing in the horizontal direction will help photosynthesis proceed faster. Carbon dioxide from the plant and the photosynthetic oxygen is removed from the leaf area faster when the wind is maintained and cover the plants with cold air.

A natural phenomenon that occurs is when the wind is strong, an air current in the wind's path becomes turbulent. From mathematical knowledge, the velocity of motion may be represented as a vector, with the speed of motion of the air represented by the size of the vector and the direction of the air flow represented by the direction of the vector. So the importantly direction of air movement is not just only speed. In different locations, the velocity of motion can rapidly shift to a different vector.

In the case of air movement, the movement of air in each direction is not just named by the direction of the moving air but also associated with a different vector clearly distinguishing winds and air currents as being completely different.

According to an aspect of the present invention, air movement control and an air source device for cultivation is described as a part of a process comprising the movement of air over crops.

Figure 1:
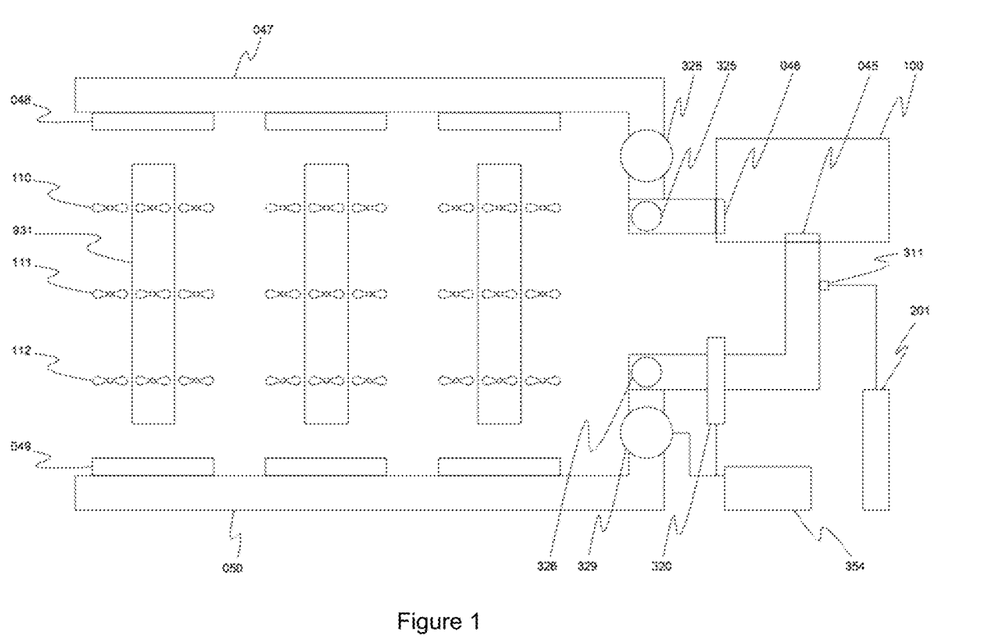
FIG. 1 is the block diagram of a plant cultivation in accordance with an embodiment of the system.
Figure 2:
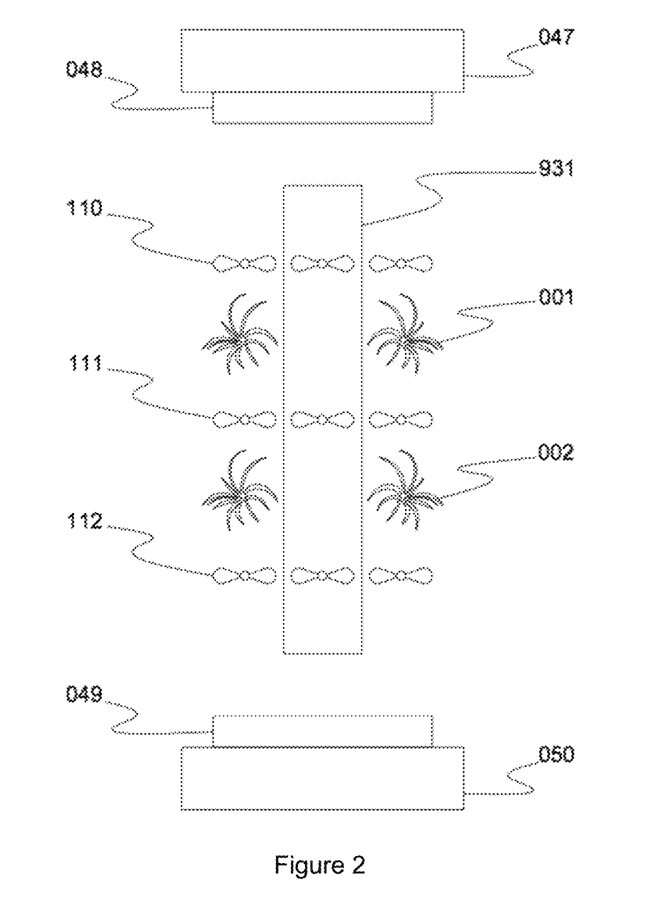
FIG. 2 is the drawing of the crop rail (931) with plants and air velocity retention devices for air movement regulation.
Figure 3:
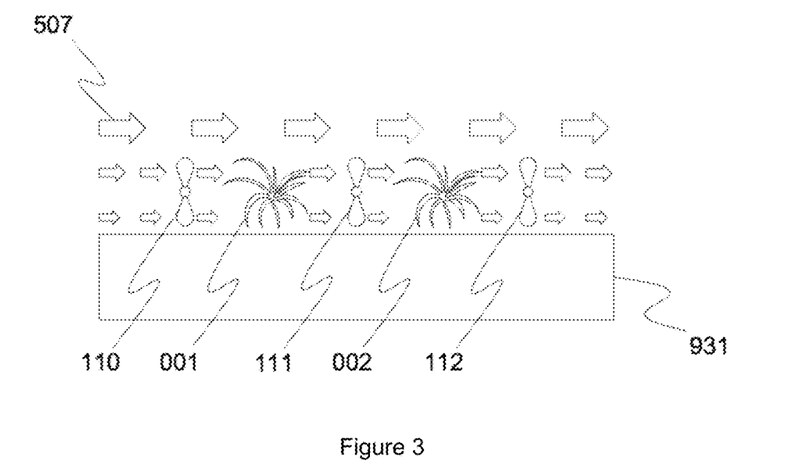
FIG. 3 is an alternate version of FIG. 2 in accordance with an embodiment with a dynamic illustration of the direction air movement.

The operation of air source devices as shown in FIGS. 1 and 2 can be described as follows. First, gas that is used for photosynthesis of plants is brought from a gas storage tank (201). The gas travels through a gas nozzle (311) to inject air into the air inlet (045) to supply air to the air conditioner (100), which regulates the air temperature to a temperature used to grow crops. Then the air is released through the air outlet of the air conditioner (046) through the air inlet accelerator (325). The air enters the air collector tube (328) and distributes air into the discharge pipe (047), which releases the air to the emission point (048), and scatters it to various points in a controlled way. When the air is released from the emission point (048), then the air is passed to a first AVRD (110) through a first plant (001) and then through a second AVRD (111) through a second plant (002) respectively and continuing through the available stages of the crops by installing equipment to maintain the speed of the movement air that are spaced at a constant speed movement of air. When air passes through the plant, it is sucked through the air intake (049) and flow into the pipe (050). That which is being sucked into the pipe (050) is the air, gases, water, and solutions formed by photosynthesis of the plant, and it is conveyed to the collecting pipe (329). It is then separated and conveyed into a two-state product: gas and liquid. Liquid products and the solution water enters into the solution tank (354). The products in a gas state enter into the air aspirator (326) and then goes to the excess moisture trap (320). The excess moisture trap (320) works as a moisture trap and separates the product into two states: Gas and liquid. The liquid can flow to the storage tank (354) for use in plant nutrient processing. The gas can flow to the gas nozzle (311) to combine with the gas being dispensed from the gas storage tank (201).

The work of air movement is continued by the devices that create air movement, as shown in FIG. 3. The operation can be explained as follows. As shown in FIG. 2, air released from the discharge point (048) is directed to an AVRD (110) in the trajectory of the air (507) flow is used to maintain a constant speed of air flow. An optimum speed may be 0.1 to 5 meters per second, but the optimum velocity depends on the growth stage of the plant, which is divided into three phases. The first stage is a seed stage. The seed stage is the embryonic axis and attaching cotyledon, and has a radicle that is ready to grow to the plant root. The second stage is the seedling stage, which is the distance from the seed stage until the plant has 3-4 leaves. The roots of the plant are longer than first stage. The third stage is the growth stage, which is the distance from the seedling stage until the plant is ready for harvest. The speed of air movement to the cultivated plant will affect the plant growth in the seedlings and growing stages. An optimal speed for drought tolerant plants is 0.3 meter per second. The optimal speed for growing plants is 1 meter per second. The air flows through the plant (001) and carries carry carbon dioxide to plant for use in photosynthesis. An optimum carbon dioxide concentrated for equipment is 450 to 1600 parts per million (ppm), while a best suitable carbon dioxide concentration is 500 to 1000 parts per million parts. At the same time that the air passes the carbon dioxide through plants, it will also blow products from photosynthesis of previous plants, such as oxygen and water vapor, and especially single molecular sugars used for plant growth (001). When the air blows through the area with a lot of plant photosynthesis, the plants will be able to synthesize photosynthesis faster than the air that passes through fewer or no plants.

At the same time, the air movement from the air source device in the process is shown in FIG. 3 as from the air conditioner (100). The air is cool enough for planting crops. The air acts to spread the cold and transfer heat to the growing area better. When the air move to the plant (001), the air passes through an unobstructed area and the speed decreased. The air velocity retention device AVRD (111) works as to speed up and give direction of the air to the plant (002). When the air moves into the plant (002) and passes through an unobstructed area, the speed is speeded up to normally by the AVRD (112). The air is drawn into the air outlet (049) and flow into the air movement device described earlier.

To meaningfully measure carbon dioxide and the other gases that affected the plant growth, measurement is made in the planting compartments (e.g., where the plants grow). These measurements may be made in two ways: automatic measurement and measure with a device that uses by data collector. We can do either or both.

An air source device for the present application may have the following characteristics:

1. The AVRD maintains the speed of the movement air in a cross-sectional area that can maintain a reasonable speed of 5 to 15,000 square centimeters, depending on the growing stage of the plant. The optimal cross-section area for the seedlings can be 10-100 cm. The optimal cross-section area for most growing plants is 10000 to 13000 square centimeters.

2. The distance between consecutive in-line AVRDs that keep the air velocity in the same plane in line may be 15 to 300 centimeters. The air velocity depends on the selected cross-sectional area that can keep the speed correlated with distance by using either one or both of engineering calculations or experimental installation and use of speed measuring velocity. In this way, the grower may control the speed of air for the growth stage of the crop. In the planted seedling stage, the air movement can maintain the speed appropriately in a range of 0.01 to 1 meter per second. The optimal speed is 0.1 to 0.7 meters per second. In growth stage, the grower can control the optimum range to be between 0.3 to 6 meters per second. The optimal speed is 0.3 to 5 meters per second.

3. Each AVRD can be installed between plants or the plants can be placed between the pairs of AVRDs to maintain air velocity. Either or both of these approaches may be used. An appropriate approach can be to install air velocity bladeless fan, air handling equipment and place plants in between consecutive pairs of AVRDs.

4. The gas storage tank (201) can be designed to have characteristics suitable for storing carbon dioxide ($CO_2$). The main gas is imported into the device can be used to create the movement of air. This can depend on the choice whether to store carbon dioxide gas or liquid, which are packaged in a pressure-resistant container as follows. Carbon dioxide cylinders are contained in high pressure $CO_2$ cylinders. Liquid carbon dioxide is stored in a pressure-resistant container under temperature control, controlling the temperature to be between −180 degrees Fahrenheit or 0 degrees Celsius (low pressure $CO_2$ tank).

5. The air conditioning device (100) adjusts the air temperature to a desired value. The air conditioner may be used as part of an air movement device, and can adjust the optimum temperature to be between 5 to 50 degrees Celsius and can adjust the optimal temperature to be between 15 to 45 degrees Celsius.

6. The air blower (325) and the air acceleration device (326) are characterized by causing the movement of air with the desired speed and desired direction. This can be achieved by rotating the propeller centrifugal force causes a liquid or air to flow along the circumferential direction. Or the air flow along the axial line into the air intake behind the propeller fan and flow through an axial fan. The device is appropriately operated as the air blower (325) and/or the air accelerator device (326). The most suitable equipment used to work as the air blower (325) and an air acceleration device (326) is a centrifugal pump. Any devices that have a speed boosting behavior, which can cause airflow or exhaust can also be used as the air blower (325) and as the air acceleration device (326) within the concept and scope of this invention.

7. The air discharge tube (047) and pipe (050) work as the passage of the airflow. It is noted that the passage of air used for crops that does not require much pressure. Also it is noted that is no corrosion from what it passes. Therefore, it is possible to employ recyclable materials and replace them. The suitable manufactured materials may include aluminum, plastic, stainless steel and foil.

8. The air collector tube (328) works to collect air from distributed intakes to a single location before releasing air to the air discharge tube (047), then the air ventilates to the emission point (048) at all emission points. So that the air from each emission point (048) has the same constant velocity, the most suitable material is aluminum, plastic, stainless steel, and the most suitable material is plastic. The surface area of the air collector tube (328) may be from 19 to 6360 square centimeters. The optimum cross sectional area of the air collector tube (328) may be from 120 to 1110 square centimeters.

9. The compilation pipe (329) collects air from the pipe (050) that receives air from the air intake (049) at each point of air entry that does not have the same pressure. Then, the air moves through the pipe (050) and is collected at the compilation pipe (329) for constant pressure storage. The air release portion of the compilation pipe (329) can shape many aspects to suit each application area. The suitable manufactured materials may include aluminum, plastic, stainless steel, and the most suitable material is plastic. The size of the air compilation pipe (329) may be from 19 to 6360 square centimeters. The optimum area of the air compilation pipe (329) may be from 120 to 1110 square centimeters.

10. The air compilation pipe (329) collects air from a pipe (050) that receives air from the air intake (049) at each point of air entry that does not have the same pressure. Then, the air moves through the pipe (050) and is collected at the air compilation pipe (329) for constant pressure storage. The air-release portion of the air compilation pipe (329) can shape many aspects to suit each application area. The suitable manufactured materials may include aluminum, plastic, stainless steel, and the most suitable material is plastic. The size of the air compilation pipe (329) may be from 19 to 6360 square centimeters. The optimum area of the air compilation pipe (329) may be from 120 to 1110 square centimeters.

11. The solution storage tank (354) can store photosynthetic products in form of liquid. It can comprise a closed container which has a two-way passage and one outlet, and store a liquid obtained from the collecting pipes (329). The liquid passing from the excess moisture trap (320) and the solution outlet are removed. It can be injected into the plant nutrient process.

12. The excess moisture trap (320) is a device that works to trap excess moisture from the air and separates the water and air. There present application may include many types of mechanical refrigeration, desiccant dehumidifier, air filter, humidity control unit and other types of elements. The excess moisture trap (320) may comprise a desiccant dehumidifier, an air filter and a humidity control unit.

13. The crop rail (931) is used to hold growing plants. The special characteristics of crop rail (931) are only limited to use with the air source device and the described process of air movement. The crop rail (931) can be both horizontal and/or vertical. The use of crop rail for the air source device preferably is:

i. Made of the suitable materials such as Polyvinyl Chloride, Polyethylene, Polypropylene, 316L stainless steel, 304 stainless steel and 308 stainless steel.

ii. Has a color on the exterior surface that gives the density of photosynthetic photon flux density (PPFD) in the range of 100-1000 microns per square meter per second (micron mol/m$^2$-sec).

iii. Has a textured surface as touched by hand or visible to eyes.

4. Has a shape allowing plants to be vertically stacked or adjacently placed horizontally.

14. Any device that can remove air from the air intake (049) and flow through the air collector tube (328) can be added. Any such added device can be viewed as one of the components of the air acceleration device (326).

15. The present application provides for aerial movement devices to be provided to the horizontal crop rails (931) so as to reduce the installation process of the air velocity retention devices.

Figure 4A:
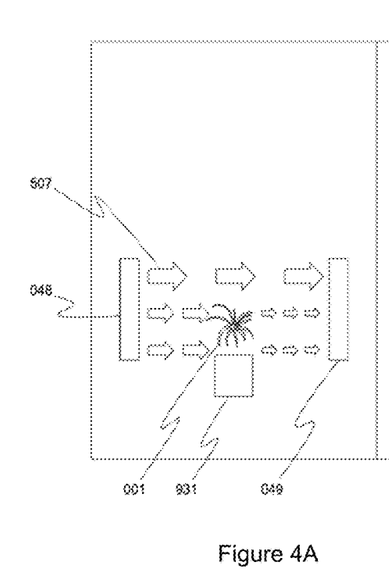
FIGS. 4A-4C are illustrations comparing the air movement at the emission point (048) and the air intake (049) of each environment.
Figure 4B:
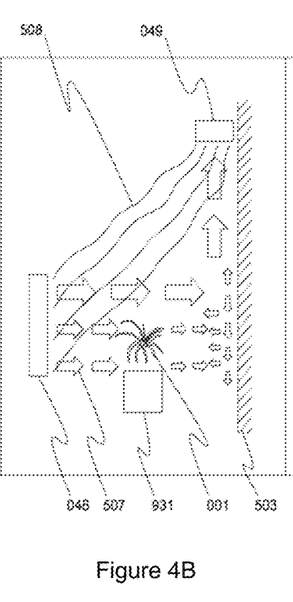
Figure 4C:
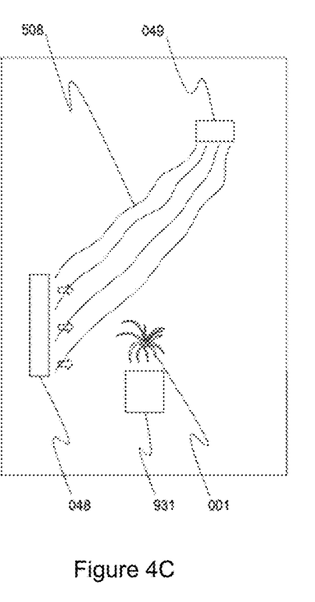

The concept and scope of the present application provides for modification of the various inventive steps and reorganizing parts of the device, for example, switching positions. The process of creating the air movement for the present application is explained. The air direction vector is determined by where the air emission (048) and the air outlet point (049) are installed. The effect of these two mounting positions for the effective of the growth of plants are compared in FIG. 4.

FIG. 4 shows a division into three separate compartments, for example, left (FIG. 4A), middle (FIG. 4B) and right compartments (FIG. 4C), respectively. These three cases are now considered.

The left-hand compartment shows the air emission point (048), the air intake (049) and the plant (001) in the same plane. Air from the air emission point (048) is released. The aerial movement (507) is directed straight to the plant (001), which is planted on the crop rail (931). That cause the speed decrease and the air move into the air intake (049), respectively. If we increase the suction pressure to the air intake (049), the air will move faster.

The middle compartment shows the air emission point (048), the air intake (049) and the plant (001) which are in the same plane. When the air is released from the air emission point (048), it represents the air movement path (507) and (508). The air movement path (507) moves through the plants (001) planted on the crop rails (931) that cause the speed decreases and move to the wall (503), and cause some change to the direction of the movement flow to the exhaust point. Some air flows in opposite directions to the air intake (049) which cause the air distributed and flow back. If the installation of the air intake (049) is in a different direction from the air emission point (048) and the plant (001), some air is suck into the air intake (049) that make a path of air movement (508). When the path of air movement is raised, the force of the movement of air move into the plant (001) is less than in the left compartment.

The right compartment shows the air emission point (048) placed in different planes from the suction point (504) and the plant (001). When the air is released from the air emission (048), the air is sucked to the air movement path (508) to make another path of air movement (507). The air pressure is less at some areas of the plant (001) and some area the air do not move through. The right compartment illustrates a case where the installation is made at an improper distance, causing the movement of air to the plant (001) to be very low if any. In this case, the plant (001) may fail to grow at full rate because the air movement is not adequate for growth.

The differences from the discussion of FIG. 4 can be shown in the comparison table below:

| Comparison | Left-hand Compartment | Middle Compartment | Right-hand Compartment |
| --- | --- | --- | --- |
| Increasing the suction in the air intake. | Can do both ways | Do not increase the suction | Increase the suction |
| Air movement characteristics | Moves from the point of air emission outlet through the plant in the same plane line | Scattered when move into the wall. | Moves from the air emission to the air outlet point in straight line and some paths do not pass through plants. |
| Movement through plants | thorough | thorough | Not thorough |
| Size or pressure of air movement when hit plants. | most | Less than the left compartment. | Less than the left and middle compartments, and sometimes does not pass the plants. |
| When the movement of air from the air emission point increases. | The plant is fully replenished and provides exhaust air at the suction point rapidly. | The plant has been fully replenished, and the direction of motion diffuses and scatters when impacting the wall; the suction point that cause it to be drawn in more slowly because of the impact directions on the wall. | In the area where the air move through the plants is not adequately replenished. |
| Operation of carbon dioxide and oxygen in photosynthesis process | Carbon dioxide flow to the photosynthetic area of plants and quickly exchanges | Oxygen and carbon dioxide diffuse on the wall and is scattered; some | As there is no air movement in the plant area, plants do not use carbon |

| Comparison | Left-hand Compartment | Middle Compartment | Right-hand Compartment |
| --- | --- | --- | --- |
| | with oxygen from that area. | oxygen moves back to area that carbon dioxide in the photosynthesis process which cause the plant to not grow as fully. | dioxide from the air emission point, and instead uses carbon dioxide within the closed compartment. This is the same process as regular crop growing without using any equipment. |

From the above comparison table, we will see that: The control of air movement affects the plant growth; Optimal control method is to control the direction of all air movement in the same direction; and By placing or installing both the air emission point (048) and the air intake (049) which are in the same line or plane as to the plant (001), different results are obtained.

The control of air movement in the same direction is divided into three types: horizontal, vertical and tilted. As discussed earlier, the horizontal movement is referred to as wind, and the vertical movement is referred to as air current.

From now on, we will consider the same directional air movement for optimal cropping. Considering the crop rail (931) there are two orientations: horizontal and vertical. The crop rail (931) may be analyzed in various cases.

Figures 5A, 5B:
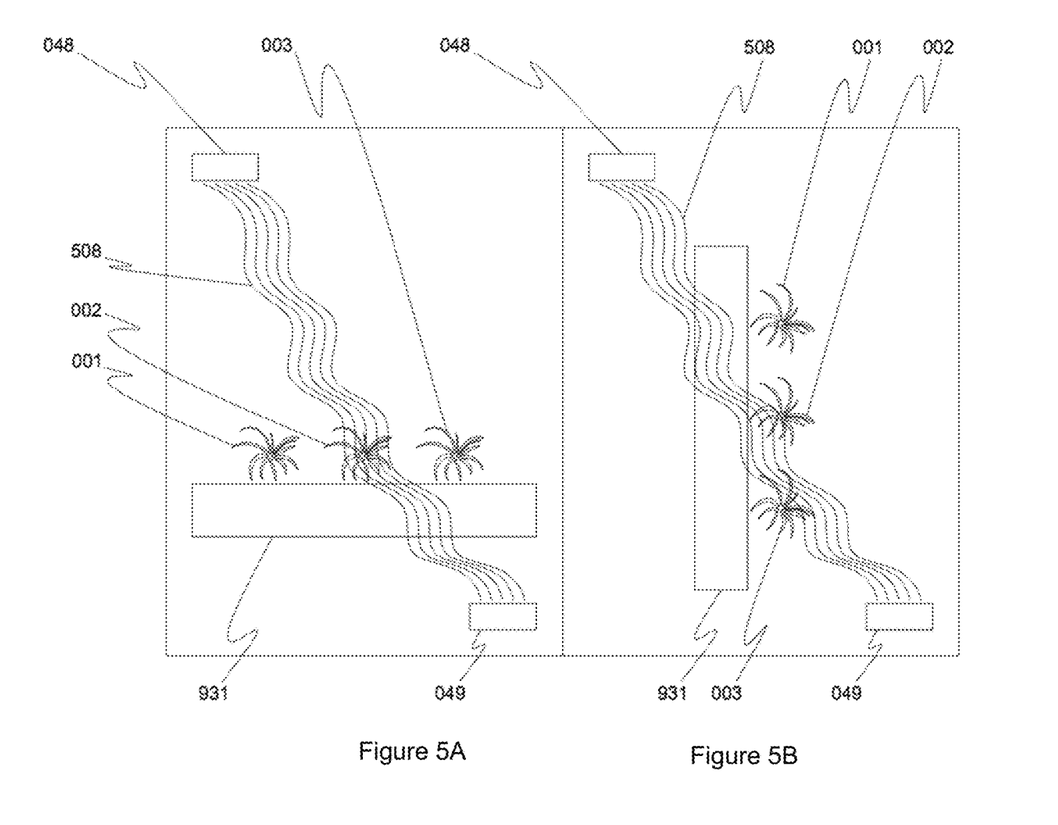
FIGS. 5A and 5B are illustrations comparing the air movement on the crop rail (931) between vertical and horizontal cultivation wherein the air movement flows in a tilted direction.
Figure 6A:
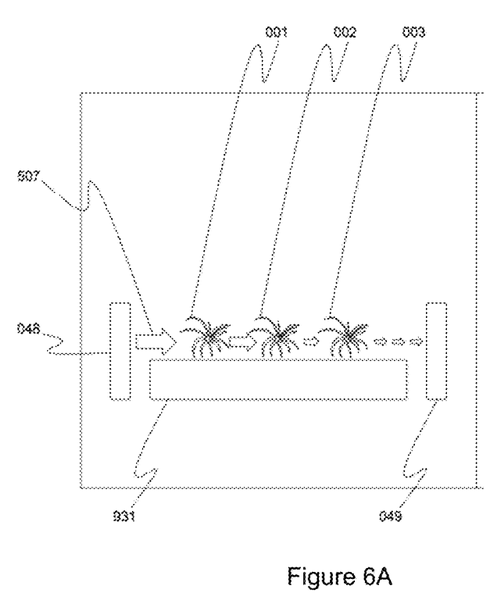
FIGS. 6A and 6B are illustrations of the crop rail (931) comprising a horizontal direction, comparing between wind and air current types of air movement.
Figure 6B:
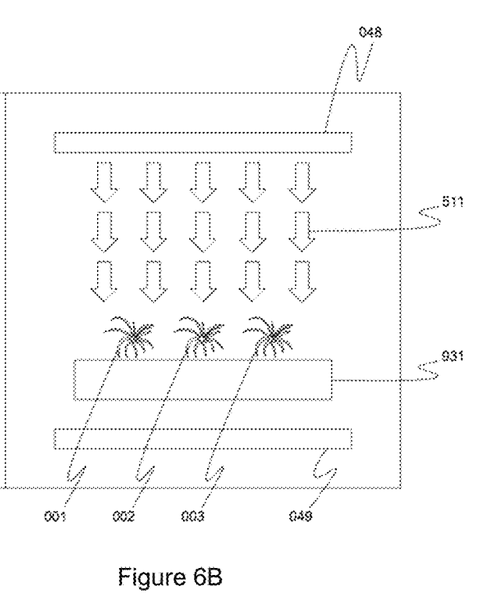

Case 1: Considering the plant growing by the moving air in angle plane, as shown in FIG. 5. We divide the image to two compartments: a left (FIG. 5A) and right (FIG. 5B) compartment. As shown in the figure, the direction of air movement is in an angle (tilted) plane flowing from the air emission point (048) to the air intake (049). It can be seen that with either the horizontal or vertical crop rail (931), there is a problem with moving air through every plant. As shown in the picture of the left-hand compartment, the horizontal crop rail (931) has the plant (001) and the plant (003) that are not in line with the movement of the air. Only the plant (002) is in same plane. As the picture on the right-hand compartment shows, the vertical crop rail (931) has the plant (002) and the plants (003) that are partially in line with the movement of the air. By placing or installing the air emission point (048) and the air intake (049) in the same position as in the figure that used the space used for planting more than the space from controlling the direction of air movement in FIGS. 6 and 7.

Case 2: Considering the horizontal crop rail (931), as shown in FIG. 6, again divided to two compartments. The left-hand compartment (FIG. 6A) shows the control air movement of wind. The right-hand compartment (FIG. 6B) shows the control air movement of air current. In the left-hand compartment, the air flow (510) from the air emission point (048) moves through plant (001), plant (002) and plant (003) respectively. The force of the airflow (510) is reduced when it passes from the plant (001) through the plant (002). The velocity of the air flow (510) is further decreased at the plant (003), because the airflow (510) pass through the plant (001) and plant (002) respectively. Then, the air flows to the air intake (049). In the right-hand compartment, the air flows out of the air emission (048) located above. The movement of the airflow (511) moves to the area of plant (001), plant (002), and plant (003). Then the air is sucked into the air intake (049). By comparing the air movement with that in the horizontal crop rail (931), the controlled air current is better than the wind because all plants have constant air speed. While using the wind, the air speed will decrease.

Case 3: Considering the vertical crop rail (931), as shown in FIG. 7, which is again divided into two compartments. The left-hand compartment (FIG. 7A) shows the direction of air movement in the wind. In the right-hand compartment (FIG. 7B), the control direction of air movement is in the form of an air current. The explanation of the left-hand compartment divides into two subcases. In the first subcase, there is no air movement control provided by AVRD (110) and AVRD (111). In the second subcase, air movement control is provided by AVRD (110), and AVRD (111). The first subcase is described below. The air flows out of the air emission point (048). The air flow (510) moves through the plant (001), the plant (002), and the plant (003), but then is obstructed by crop rail (931) before it can flow to the air intake (049). Vertical crops planting often uses at least one in line crop rail (931). If the crop rail (931) installations are spaced far apart, the airflow (510) is further reduced. So that the crop rail (931) near the air intake (049) have less the air flow (510). Carbon dioxide from the airflow (510), which could assist in photosynthesis by more rapid replacement of carbon dioxide and oxygen, is reduced. The temperature of the airflow (510) is also unevenly distributed. So a plant on the crop rail (931) that is far away from the air emission point (048) will grow worse, not grow at all, or may eventually die. In Case 3, use of the vertical crop rail (931) must consider the weight of gas unlike growing crops in horizontal. Carbon dioxide is heavier than oxygen, so making the emitted carbon dioxide flow to the bottom. The velocity of the airflow (510) help the carbon dioxide to be distributed horizontally. But when speed of the airflow (510) drops, carbon dioxide will gradually fall to the bottom of the crop rail (931). And when the height of the crop rail (931) increases, the planted area above will have less chance to grow, and plants on upper crop rails cannot grow. This is another major concern in crop planting.

Figures 7A, 7B:
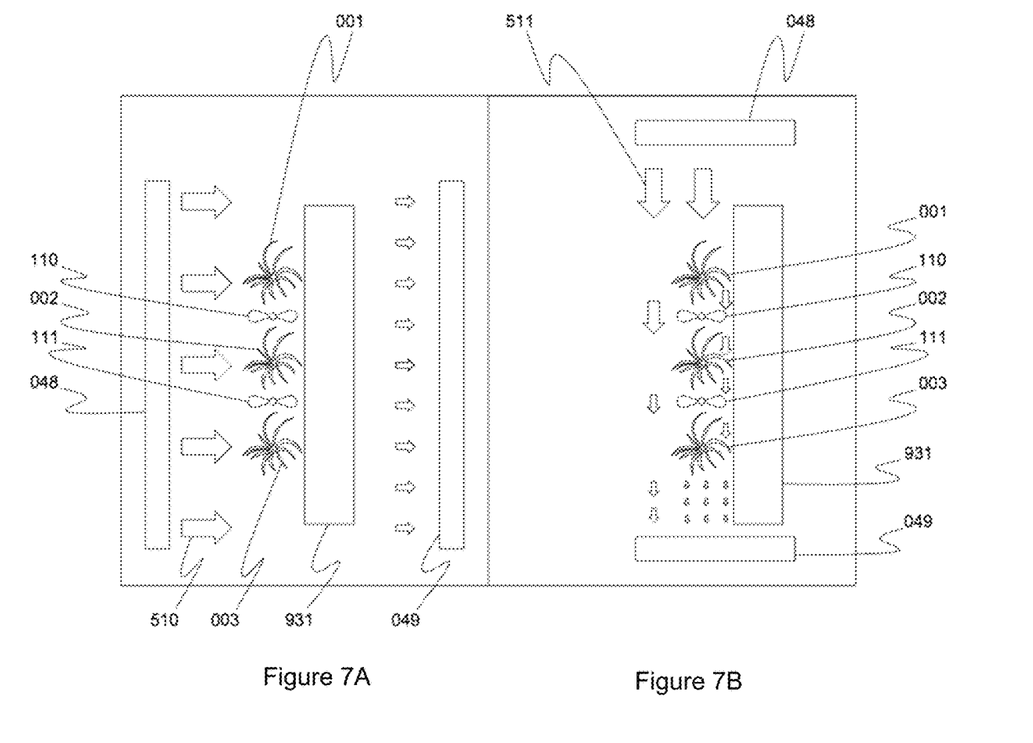
FIGS. 7A and 7B are illustrations of the crop rail (931) comprising a vertical direction, comparing between wind and air current types of air movement.

The second subcase is described as follows. The airflow out of the air emission point (048) into the airflow (510) and flow through the plant (001), the plant (002), the plant (003), AVRD (110) and the crop rail (931) into the air intake (049). AVRD (110) and AVRD (111) operate to their installation characteristics. This can be installed in two ways: a wind installation or an air current installation. The wind installation keeps the velocity of the airflow (510) constantly, or close to the velocity of the airflow (510) from the air emission point (048), but this arrangement is very problematic because of obstruction from the wind, such as the crop rail (931). Such a system requires more energy and power to keep speed of the air flow constant. For a vertical crop rail (931) with at least one rail added, the velocity of the airflow (510) at the crop rail (931) drops down sequentially. The engineering calculations to install AVRD (110) and AVRD (111) device in each rail are unequal, and are difficult to produce. It also does not solve the problem of carbon dioxide flow down the bottom of the crop rail (931). The plants at the top of the crop rail (931) grow less or not grow at all. A second installation method, which work to create air current as the vertical air movement, keeps carbon dioxide flowing down gradually, and causes the carbon dioxide to float around the plant in plane. However, because the wind and the air current are perpendicular, this creates new force in that area which cause diffusion so that the replacement of carbon dioxide and oxygen does not work functionally, thus introducing a new problem. In addition, the installation does not solve the problem of the vertical crop rail (931), because this installation cannot carry the airflow (510) to flow through every crop rail (931) in the plant left hand compartment.

The right-hand compartment shows the control of the air movement direction I the form of an air current. In the right-hand compartment, which can be divided the explanation into two subcases: the first subcase describes the air movement without AVRD (110) and AVRD (111). In the second subcase, the air movements with AVRD (110) and AVRD (111) are described as follows. The air flows out of the air emission point (048) and form the air flow (511) which flows down through the plant (001), plant (002) and plant (003). Then the air flows into the air intake (049). In addition to the airflow (511), the speed at the air emission point (048) is set, and the proper temperature distribution is readily available for each type of plant to keep the temperature of the upper region cooler than the bottom region for creating the air currents naturally. So this makes the air movement stronger than the other plane. If the horizontal crop rail (931) is used, the effects may not be clearly noticeable because there is only one crop rail plane. For a crop rail (931) that is vertically oriented, the results are clear because it has the multiple crop rails. So when the crop is located very high, it uses less energy to generate air velocity than other cases because it involves a natural air current that increases the energy of air movement. In the air release process, the carbon dioxide is mixed for plant photosynthesis. The carbon dioxide is heavier than oxygen, so it flows down to the bottom. This causes the plants on the top crop rail (931) to grow less. At the higher crop rail (931), the plants experience less photosynthesis, even if the light is uniform, because the carbon dioxide needed for photosynthesis falls to lower levels.

The second subcase is described as follows. The air flows through the air emission point (048) in from the airflow (511) through the plant (001), AVRD (110), the plant (002), AVRD (111), the plant (003), and then finally to the air intake (049). This maintains the velocity of airflow (511) and keeps the collisions of carbon dioxide, causing it to slowly flow back to the top and make accelerated photosynthesis occur on every floor.

As indicated in Case 1, the appropriate air movement for planting is a combination of wind and air current. For Case 2, the optimal air movement for horizontal crop is the air current, because it does not require any additional equipment to solve the problem. For Case 3, the optimal air movement for a vertical crop is the air current is an unsolved problem but has less problem than the wind. And increasing the speed of air treatment equipment can solve the problem of maintaining the speed of air movement, temperature distribution and keeping the carbon dioxide density constant.

In summary, the process of creating air movement for planting has the following special characteristics.

1: Determine the direction of air movement to cover the growing area so that the air is moving around the plant stem to support photosynthesis and exchange carbon dioxide and oxygen by using the wind or the air current. Controlling the direction of air movement can be achieved by installing the position of an air velocity retention device (ACRD) so that the air flow from the air emission point (048) to the air intake (049) is in alignment with the air velocity retention device which is mounted on the crop rail (931) located perpendicularly and horizontally to the air emission point (048) and the air intake (049), or at an angle from the plane of the air emission point (048) and the air outlet point (049) that is less than or equal to 45 degrees. The most appropriate installation of the crop rail (931) is perpendicular to the plane of the air emission point (048) and the air intake (049).

2: Additional air velocity retention devices can be added in the same manner as may be needed and suitably coordinated with the crop rails.

3: When installed, the equipment should maintain air velocity and cause the direction of air movement to be in the same direction as the direction of air flow out of the air emission point (048).

Additionally, the process of creating the air movement control that is most suitable for planting may include:

1. Determine the direction of air movement that cover the crop area by using direction of air current. Inducing an angle in the direction of airflow can be achieved by the position of installed air source devices so as to be at least roughly aligned with the air flow from the air emission point (048) to the air intake (049). Further, install air velocity retention devices (AVRDs) on the crop rails perpendicular to the horizontal plane of the air emission (048) and the air intake (049), or at an angle to the path between the air emission point (048) and the air intake (049) that is less than or equal 45 degrees. The appropriate position for this is perpendicular to the plane line of the air emission point (048) and the air intake (049).

2. Additional air velocity retention devices may be added in the same manner, as may be needed and suitably coordinated with the crop rails.

3. Install AVRDs that maintain air velocity and cause the direction of air movement in the same direction as the direction of air flow out of the air emission point (048) and the air intake (049).

This concept and scope of the present application provides for the process of creating the air movement control applied to horizontal and vertical crop rail and can comprise more than one physical component.

With a bladed fan, it is difficult to control the speed of air movement optimally over all of the same area. This may result in the unequal growth of plants over that area, which is a significant problem in standard control for industrial crops. Thus, as mentioned above, in an embodiment, the AVRD comprises a bladeless fan. For instance, an AVRD arranged between the emission point (048) and air intake (049), to maintain the velocity of air across a crop rail (931) positioned between the two, may comprise a bladeless fan.

While bladeless fans have the advantage of safety, easy maintenance, and the ability to clean the air prior to blowing it out, the speed of air movement is generally insufficient for industrial crops. In addition, as the size of the fan increases, the movement of some air becomes non-linear and spiral turbulence can form, which has a negative effect on plants. Specifically, plants require carbon dioxide for photosynthesis. Therefore, the air flow must carry carbon dioxide to the area of the plants and carry oxygen, resulting from the photosynthesis, out of that area. Proper air flow must be in one direction. If turbulence occurs, it can create a non-gas area, and the plants in that area will eventually die.

Figure 8A:
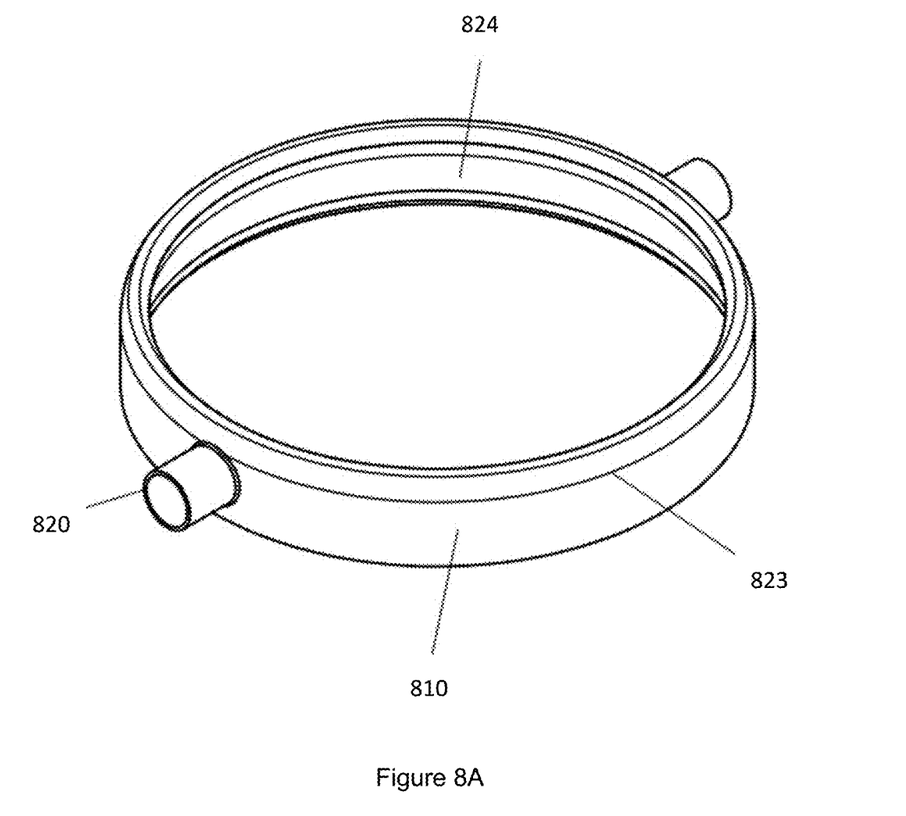
FIGS. 8A-8C are illustrations of a bladeless fan, according to an embodiment.
Figure 8B:
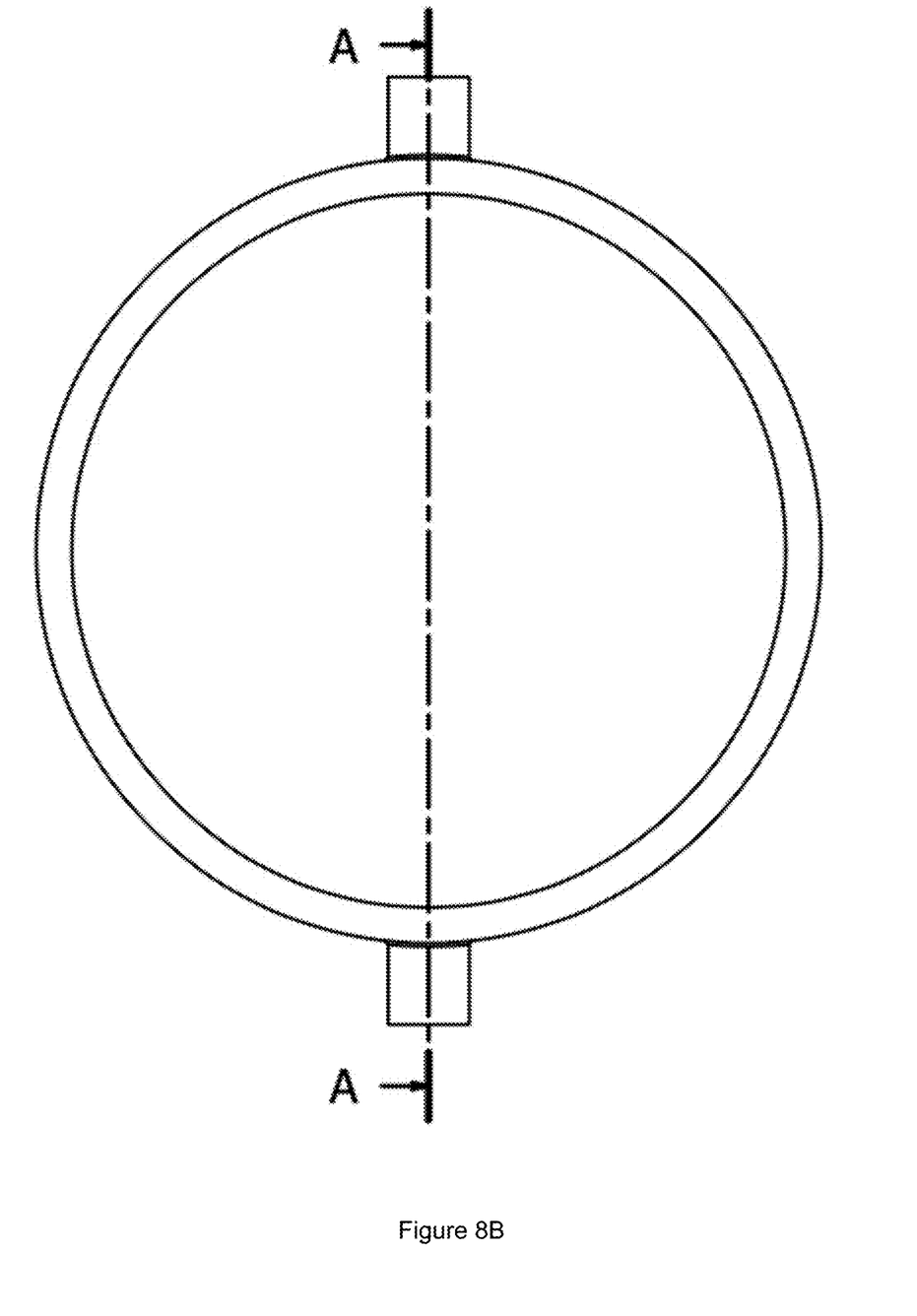

FIGS. 8A and 8B are a perspective view and front view, respectively, of a bladeless fan (810), according to an embodiment. It should be understood that this bladeless fan (810) may represent any of the AVRDs described herein, such as first AVRD (110), second AVRD (111), third AVRD (112), and so on. The bladeless fan (810) has a hollow substantially cylindrical shape, with an outer perimeter wall (823) and an inner perimeter wall (824). In an embodiment, the outer perimeter wall (823) has a diameter in the range of 210-5,000 mm, and the inner perimeter wall (824) has a diameter in the range of 200-4,990 mm.

The bladeless fan (810) has a fluid pipe (820) on each side. As illustrated, the fluid pipe (820) on each side are aligned with each other along the axis A. Air may flow into the bladeless fan (810) via the fluid pipes (820).

Figure 8C:
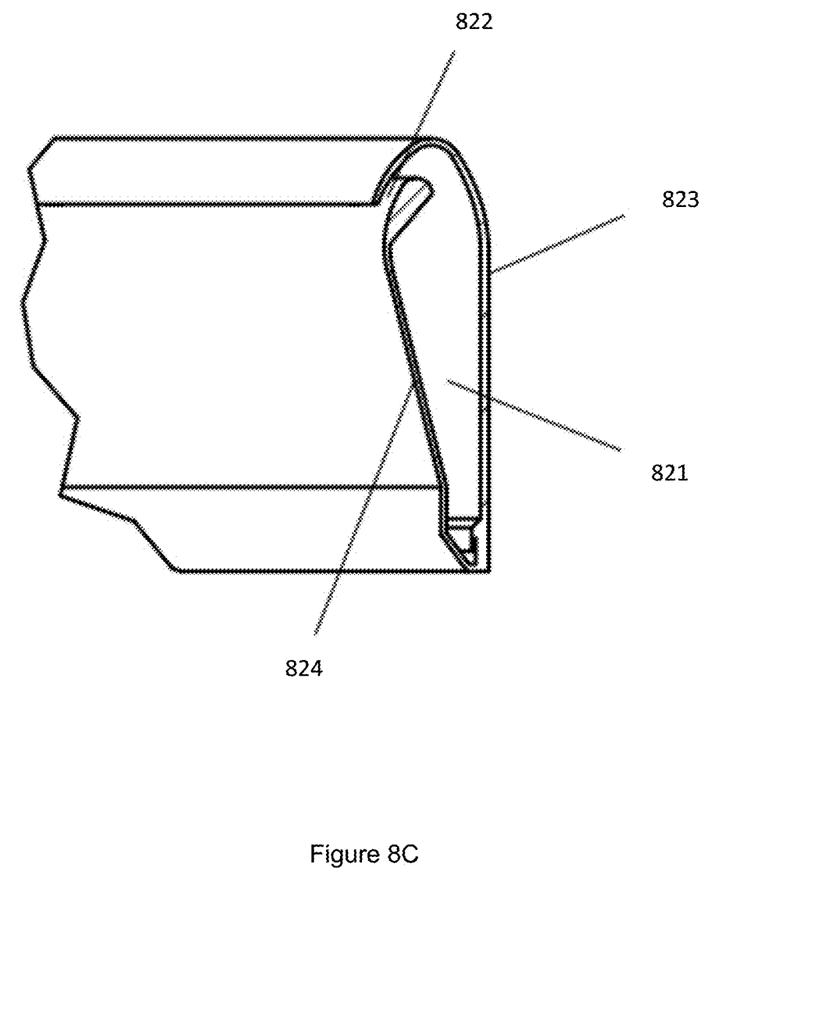

FIG. 8C is a cut-away view of the bladeless fan (810), showing the internal annular airway (821) between the outer perimeter wall (823) and the inner perimeter wall (824), according to an embodiment. Specifically, the outer perimeter wall (823) and the inner perimeter wall (824) are connected (e.g., indirectly or directly via fastening edges) to form a hollow annular housing. In the illustrated embodiment, the distance between the outer perimeter wall (823) and the inner parameter wall (824) is not uniform, such that the width of the annular airway (821) is not uniform. For example, the distance may gradually decrease from a first side (e.g., the side closest to the emission point (048)) of the bladeless fan (810) to a second side (e.g., the side farthest from the emission point (048)) of the bladeless fan (810). In other words, the width of the annular airway (821) gradually decreases along an axis from the first side to the second side (i.e., orthogonal to a plane in which the annular housing lies). In this case, it should be understood that, assuming the thickness of the inner perimeter wall (824) is uniform, the inner diameter of inner perimeter wall (824) will gradually increase from the smallest diameter at the first side to the greatest diameter at the second side of the bladeless fan (810). The width of the annular airway (821) (i.e., the distance between the outer perimeter wall (823) and the inner perimeter wall (824)) will affect the speed of air flow. However, at a certain width, it cannot increase the speed of air movement. An appropriate width (e.g., maximum width) is in the range of 7-30 mm, and, in an embodiment, the optimum maximum width is 10 mm.

As illustrated in FIG. 8C, the internal space between the outer perimeter (823) and the inner perimeter (824) defines a hollow annular airway (821). The airway (821) is connected to the fluid pipes (820), as well as the air outlet ventilator (822), which may form a ring around the entire inner circumference of bladeless fan (810). Thus, air may flow through the fluid pipes (820) into the airway (821) and out of the ventilator (822) to produce air flow out of the bladeless fan (81). Specifically, the fluid pipes (820) in at least the first AVRD (110) may be connected (e.g., welded) to the discharge pipe (047), such that air flows from the discharge pipe (047) through the fluid pipes (820) into the hollow annular airway (821) between the outer perimeter (823) and the inner perimeter (824). The air moves around the hollow annular airway (821), producing a lower air density, resulting in unequal air pressure with respect to the outside of the bladeless fan (810). The unequal air pressure forces the air out of the ventilator (122), which is directed toward the second side of the bladeless fan (810), to thereby cause air to flow out towards the second side of the bladeless fan (810). This air flow blows across the crop area on that side of the bladeless fan (810). In other words, the bladeless fan (810) draws air and pushes it across the crop area (e.g., 001). The air movement across the crop area draws carbon dioxide from the emission point (048) to the crop area and draws oxygen from the crop area towards the air intake (049). Thus, the bladeless fan (810) increases the speed of air movement and provides carbon dioxide to at least one plant (e.g., 001). Thus, crops on the second side of the bladeless fan (810) grow in the same condition as crops on the first side of the bladeless fan.

Subsequent AVRDs (e.g., 111, 112), comprising bladeless fans (810), may perform the same process of air flow as the first AVRD (e.g., 110), comprising a bladeless fan (810). However, the subsequent AVRDs (111, 112) may have a different function than the first AVRD (110). Specifically, since the first AVRD (110) has already provided air movement, the subsequent AVRDs (111, 112) simply need to maintain or retain the velocity of the air (e.g., accelerate the air from the first AVRD (110)). Notably, the number of fluid pipes (820) and the distance of the fluid pipes (820) from each other affect airflow, including linear and spiral turbulence. Since less force is required by the subsequent AVRDs (111, 112), the subsequent AVRDs (111, 112) may have fewer fluid pipes (820). For example, whereas the first AVRD (110) may have two or more fluid pipes (820), the subsequent AVRDs (111, 112) may only have a single fluid pipe (820), and these fluid pipes (820) may draw air from the first AVRD (110), rather than from the discharge pipe (047). Alternatively, all of the AVRDs (110, 111, 112) may have a plurality of fluid pipes (820). In either case, in an embodiment, all of the fluid pipes (820) of the bladeless fan (810) may be equidistantly spaced from each other around the circumference of the bladeless fan (810).

What is claimed is:

1. An air movement system for plant cultivation, the air movement system comprising:
   an air conditioner configured to receive a gas mixture of air and carbon dioxide, regulate a temperature of the gas mixture, and output the gas mixture at a regulated temperature;
   a first bladeless fan configured to receive the gas mixture output by the air conditioner and supply the gas mixture as an air flow to a first crop area at a velocity towards an air intake; and
   at least one second bladeless fan disposed between the first crop area and a second crop area, and configured to assist the air flow from the first crop area to the second crop area so as to maintain the velocity towards the air intake,
   wherein each of the first bladeless fan and the at least one second bladeless fan comprises an annular housing,
   wherein the annular housing comprises an outer perimeter wall and an inner perimeter wall,
   wherein the outer perimeter wall and the inner perimeter wall are joined to define an annular airway between the outer perimeter wall and the inner perimeter wall, and an annular ventilator around an inner circumference of the annular housing,
   wherein the annular ventilator is directed towards one side of the annular housing,
   wherein the annular housing comprises at least one fluid pipe that provides a pathway from an exterior of the annular housing to the annular airway, such that air is configured to flow from an exterior of the annular housing through the at least one fluid pipe to the annular airway and out of the annular ventilator, wherein the first bladeless fan comprises two or more fluid pipes, and wherein the two or more fluid pipes are equidistantly spaced around a circumference of the annular housing.

2. The air movement system of claim 1, wherein a diameter of the outer perimeter wall is within a range of 210 to 5,000 millimeters.

3. The air movement system of claim 2, wherein a diameter of the inner perimeter wall is within a range of 200 to 4,990 millimeters.

4. The air movement system of claim 1, wherein a maximum width of the annular airway is in a range of 7 to 30 millimeters.

5. The air movement system of claim 1, wherein a maximum width of the annular airway is 10 millimeters.

6. The air movement system of claim 1, wherein the at least one second bladeless fan consists of only a single fluid pipe.

7. The air movement system of claim 1, wherein the air conditioner outputs the gas mixture to a discharge pipe, and wherein the at least one fluid pipe of the first bladeless fan is connected to the discharge pipe of the air conditioner.

8. The air movement system of claim 1, wherein a width of the annular airway decreases along an axis that is orthogonal to a plane of the annular housing from one side of the bladeless fan to an opposite side of the bladeless fan.

9. The air movement system of claim 1, wherein the first bladeless fan and the at least one second bladeless fan are arranged along a same linear axis.

10. The air movement system of claim 9, wherein the at least one second bladeless fan comprises a plurality of second bladeless fans arranged along the same linear axis.

11. The air movement system of claim 1, wherein the first crop area and the second crop area are both on a same crop rail.

12. An air movement system for plant cultivation, the air movement system comprising:

an air conditioner configured to receive a gas mixture of air and carbon dioxide, regulate a temperature of the gas mixture, and output the gas mixture at a regulated temperature;

a first bladeless fan configured to receive the gas mixture output by the air conditioner and supply the gas mixture as an air flow to a first crop area at a velocity towards an air intake; and at least one second bladeless fan disposed between the first crop area and a second crop area, and configured to assist the air flow from the first crop area to the second crop area so as to maintain the velocity towards the air intake, wherein each of the first bladeless fan and the at least one second bladeless fan comprises an annular housing, wherein the annular housing comprises an outer perimeter wall and an inner perimeter wall, wherein the outer perimeter wall and the inner perimeter wall are joined to define an annular airway between the outer perimeter wall and the inner perimeter wall, and an annular ventilator around an inner circumference of the annular housing, wherein the annular ventilator is directed towards one side of the annular housing, wherein the annular housing comprises at least one fluid pipe that provides a pathway from an exterior of the annular housing to the annular airway, such that air is configured to flow from an exterior of the annular housing through the at least one fluid pipe to the annular airway and out of the annular ventilator, wherein the at least one second bladeless fan comprises a plurality of fluid pipes, and wherein the plurality of fluid pipes are equidistantly spaced around the circumference of the annular housing.

* * * * *